United States Patent [19]
Karasz

[11] 3,745,974
[45] July 17, 1973

[54] PET TRAINING TRAY
[76] Inventor: Margaret K. Karasz, 164 Colonial Avenue, Albany, N.Y. 12208
[22] Filed: Dec. 17, 1971
[21] Appl. No.: 209,210

[52] U.S. Cl. .................................. 119/1, 15/257.1
[51] Int. Cl. ........................................... A01k 29/00
[58] Field of Search ...................... 119/1; 15/257.1, 15/257.2; 294/1 R, 19 R, 55

[56] References Cited
UNITED STATES PATENTS
| | | | |
|---|---|---|---|
| 719,943 | 2/1903 | Hopkins | 15/257.1 |
| 3,278,969 | 10/1966 | Wenzlaff et al. | 15/257.1 X |
| 1,264,433 | 4/1918 | Posten | 294/55 |

Primary Examiner—Russell R. Kinsey
Assistant Examiner—J. N. Eskovitz
Attorney—Dean S. Edmonds, Harry C. Jones III et al.

[57] ABSTRACT

A simple litter or training station preferably of plastic having a flat bottom and raised sides, a handle at one end and means at the other for inclining the tray toward the handle, a cutout being provided in the raised side and bottom for removal of animal waste into a standard toilet receptacle.

2 Claims, 4 Drawing Figures

PATENTED JUL 17 1973　　　　　　　3,745,974

PET TRAINING TRAY

BACKGROUND OF THE INVENTION

Litter stations for household pets generally consist of some form of four-sided receptacle into which paper or other absorbent material is placed in order to absorb animal wastes. Such devices are frequently cumbersome and messy and altogether involve considerable difficulty to empty and keep clean. One form of manufactured litter or training station which has been proposed is shown in U.S. Pat. No. 3,386,417. This device has the mentioned drawback that disposal of waste material and maintaining cleanliness of the receptacle is not easy. U.S. Pat. No. 2,053,594 discloses a different form of litter station which includes means for emptying waste therefrom into a toilet receptacle; however, the device of this patent is quite cumbersome, complicated to manufacture and very expensive.

It is the purpose of the present invention to obviate the difficulties of known prior art litter stations including those similar to the patented litter stations referred to.

SUMMARY OF THE INVENTION

In accordance with the present invention, there is provided a light, portable litter or training station for small household pets such as, for example, kittens or puppies comprising a flat tray preferably of plastic having short raised sides integrally connected to the bottom of the tray continuously extending around the sides and rear portions thereof, a handle secured to the rearward side, means preferably in the form of short legs projecting underneath the forward portion of the tray and a central arcuate cutout in the leading or forward portion of the tray bottom, the sides extending along the forward part of the tray up to the edges of the cutout, the cutout permitting animal wastes to be removed from forward portions of the tray, for example, into a toilet receptacle and the forwardly positioned legs causing the tray to be inclined from front to rear so that liquid wastes will be contained.

DESCRIPTION OF A PARTICULAR EMBODIMENT

Figure 1:
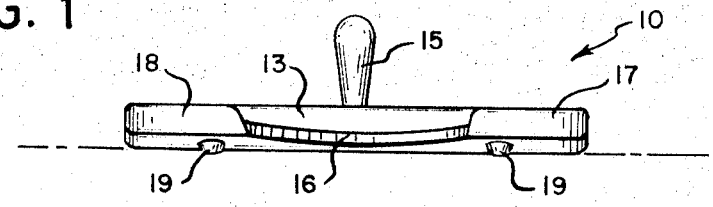
FIG. 1 is a front view of the pet training tray of the invention.

Referring now to the drawing, a training tray or litter station 10 has been illustrated, preferably manufactured of suitable plastic material such as polypropylene. The tray 10 has a flat bottom 11 to which is integrally connected short upright sides 12, 13 and 14 which continuously extend about the periphery of the tray bottom 11 along the sides and rear portions thereof. A handle 15 is connected to the rear side 13 and to the bottom 11 enabling the tray to be easily lifted.

Figure 2:
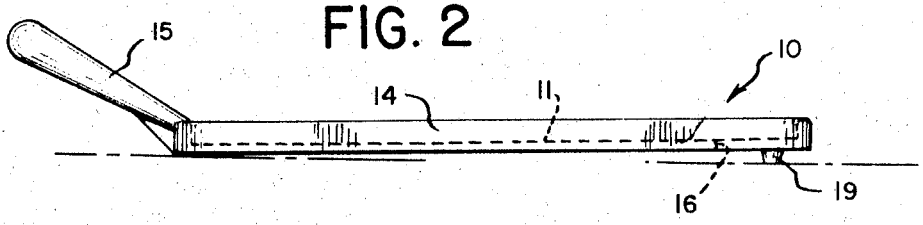
FIG. 2 is a side elevation of the tray of FIG. 1

The forward part of the bottom 11 defines an arcuate cutout 16 and forward sides 17 and 18 integrally connected to sides 12 and 14 and to the bottom 11 extending up to the edge of cutout 16. Two legs 19 are attached to the bottom 11 extending downwardly therefrom one at each side of the cutout 16. As seen in FIG. 2, the legs 19 cause the tray 10 when placed upon a horizontal surface, such as a floor, to be inclined from front to rear that is, the lowest point of inclination is furthest from the cutout 16. This configuration assures that liquid waste will flow toward the rear portions of the tray and will be thus contained within sides 12, 13 and 14. It will be understood, of course, that conventional absorbent material in the form of particulate or granular material or sheets of absorbent paper can be placed in the usual manner within the tray so as to minimize odor contact of waste materials with the tray bottom.

Figure 3:
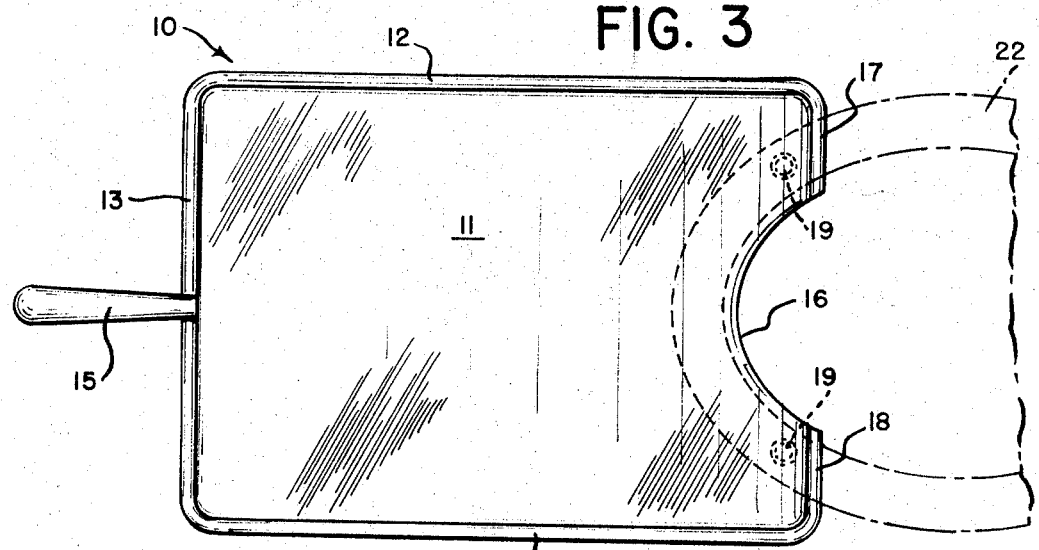
FIG. 3 is a plan view.
Figure 4:
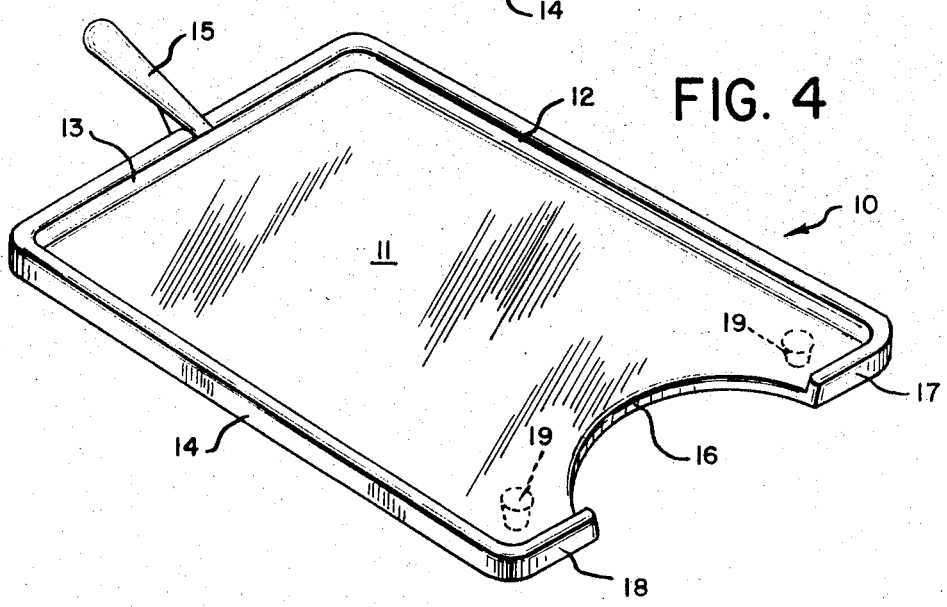
FIG. 4 is a perspective view.

As seen in FIG. 3, the tray 10 can readily be carried in one hand and when placed upon the forward edge of a standard toilet receptacle 22, the animal waste can easily be slid from the tray 10 into the toilet bowl. When the tray is in this position, cleaning of the tray is extremely simple.

In accordance with the present invention and the foregoing description thereof, a litter station in the form of a tray has been devised which is extremely simple and inexpensive to manufacture. The tray is lightweight, very portable, and is readily and hygienically emptied into a standard toilet receptacle.

It will be understood that the foregoing description is related to a particular embodiment of the invention and is therefore representative. In order to appreciate fully the scope of the invention, reference should be made to the appended claims.

I claim:

1. A litter station for use as a training device or a litter receptacle for small household animals comprising a tray having:
   a. a flat bottom of generally rectangular construction with side parts, a forward part, and a rearward part;
   b. an arcuate cutout portion defined by said bottom in said forward part, said cutout being substantially similar to a toilet receptacle and having a maximum dimension across the forward part which is less than the distance between the side parts;
   c. a handle connected to the rear part of the tray opposite the cutout for moving the tray and in cooperation with the toilet receptacle disposing of the waste;
   d. upraised sides extending around the entire periphery of the bottom except for the cutout such that when disposing of the waste it can flow only through the cutout portion of the bottom;
   e. said bottom having two legs disposed on either side of the cutout for inclining the tray away from the cutout when placed on a horizontal surface causing waste deposited on the tray to flow toward rear away from the cutout thereby maintaining the waste within the confines of the tray until disposal is desired.

2. The tray according to claim 1 wherein said legs are positioned relative the cutout coinciding with a front part of a standard receptacle leaving the cutout portion within said front part such that when said legs are placed on said front part the tray will be positioned correctly with respect to the standard receptacle allowing for disposal of the waste without spilling.

* * * * *